Feb. 7, 1928.
W. AAB
EXPANSION REAMER
Filed June 29, 1923
1,658,180
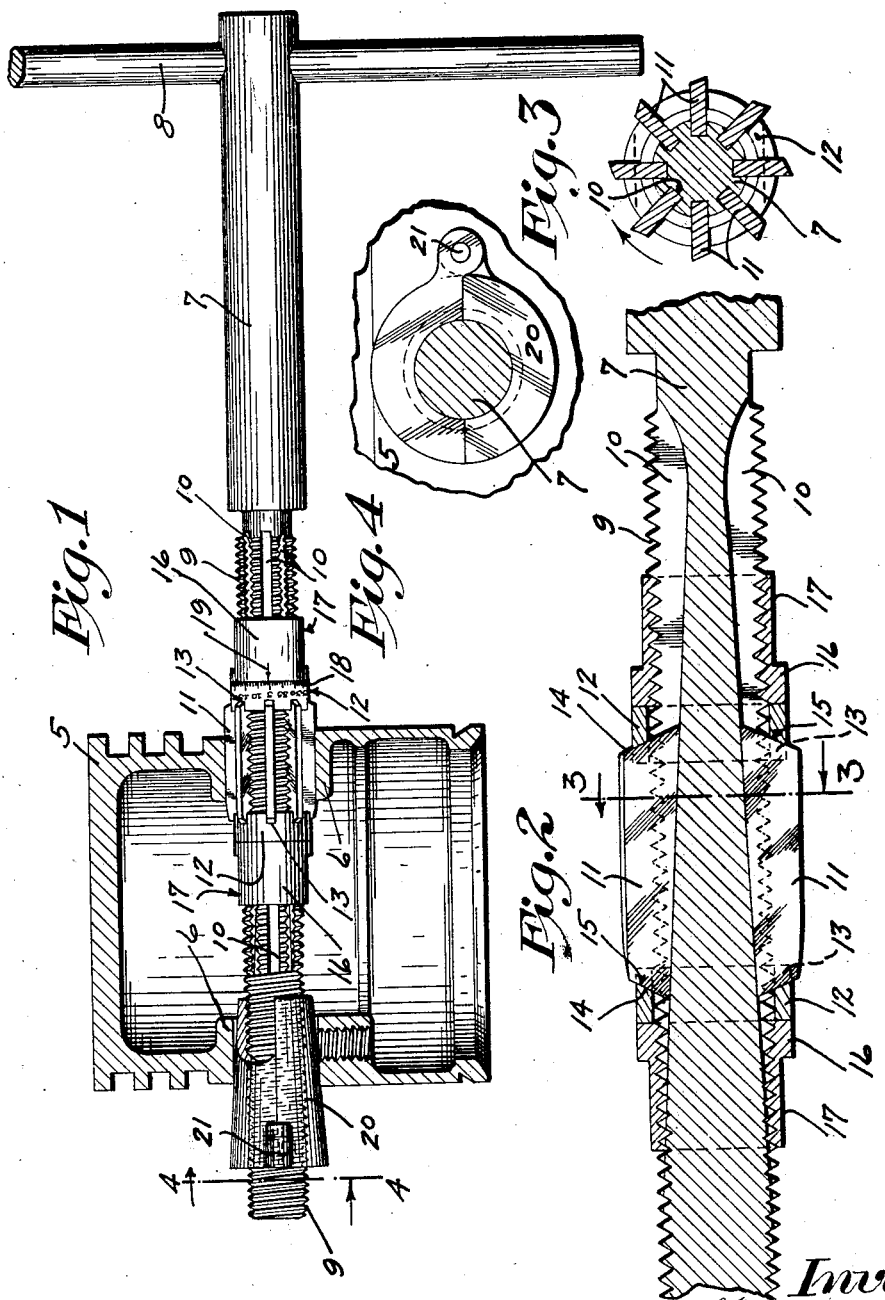
Inventor
William Aab
By his Attorneys Patented Feb. 7, 1928.

1,658,180

UNITED STATES PATENT OFFICE.

WILLIAM AAB, OF NEW ULM, MINNESOTA.

EXPANSION REAMER.

Application filed June 29, 1923. Serial No. 648,490.

My present invention relates to expansion reamers intended for general use, but especially adapted for reaming the pin seats in pistons and the like.

Expansion reamers now commonly used in this class of work cannot be accurately guided so as to form true axially aligned pin seats, and as a result, the pins mounted therein will extend slightly oblique to the axes of said seats and thereby engage the same only at their ends and at diametrically opposite points so that the pin seats soon wear and thereby loosen said pins.

Furthermore, these reamers are so constructed that only a comparatively few circumferentially spaced knives can be used, and hence they will not ream a seat to a true bore and will leave high spots thereon that soon wear and loosen the pins mounted therein.

By the use only a few knives, the same will bind in the pin seat under the cutting action and thereby produce such friction as to cause the cutter to turn very hard which also makes it very difficult to hold the knives firmly in their seats. Said knives are also comparatively long, thereby making it difficult to firmly hold the same and necessitates the use of intermediate abutments which limit the axial movement of the cutter on its operating shaft.

The object of my invention is to overcome the above objections by so constructing and mounting the cutter of a reamer to cause the same to ream a seat to a true bore so that the same will engage a pin mounted therein throughout its entire circumference. Said invention also provides means for guiding the reamer so as to ream a pair of seats to true axial alignment and thereby cause the same to engage a pin mounted therein throughout the entire length of the pin seat. Said invention also includes automatic means for feeding the cutter of the reamer axially into a pin seat.

My invention further provides important improvements which, together with the above noted features, produce an extremely simple and highly efficient reamer that is easy to operate and will, at the same time, produce accurate work which is highly essential in fitting pins in their seats in order to secure the maximum amount of wear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view of a piston in longitudinal section taken centrally through its pin seats, and also illustrates the improved reamer mounted in said seats;

Fig. 2 is a view principally in longitudinal section taken centrally through the operating shaft and cutter, on an enlarged scale;

Fig. 3 is a detail view in section taken on the line 3—3 of Fig. 2; and

Fig. 4 is a detail view with some parts sectioned on the line 4—4 of Fig. 1, on an enlarged scale.

For the purpose of illustrating the invention applied in working position, there is shown in the drawings one of the pistons 5 of an internal combustion engine, and which piston has a pair of diametrically opposite axially aligned seats 6 for the pin of a connecting rod, not shown.

The improved reamer includes an operating shaft 7 having at one end a transverse operating pin 8 by which said shaft may be rotated. Said operating shaft 7 is circumferentially reduced from its other end throughout more than one-half of its entire length, and this reduced portion of the operating shaft 7 is screw-threaded at 9. A plurality of circumferentially spaced longitudinal channels 10 are formed in the reduced portion of the operating shaft 7, and which channels extend from the inner end of the reduced portion of the operating shaft and terminate short of the free end thereof. The bottoms of the channels 10 are longitudinally inclined away from the operating pin 8.

The improved reamer also includes a cutter comprising a plurality of circumferentially spaced flat knife blades 11 mounted on the operating shaft 7 for axial and radial adjustments, and which knife blades have their outer longitudinal surfaces ground to afford cutting edges. These knife blades 11 are mounted in the channels 10, and their lower edges are reversely inclined from the bottoms of said channels on which they rest for parallel endwise sliding movement longitudinally of the operating shaft 7.

of the abutment block 8, while the laterally extending portion 19 from this buffer plate 18 is formed with a pair of spring receiving channels 20 to receive the spring units 11.

Pockets 21 are formed at the end of the channels 20, adjacent the buffer plate 18 by the flange 22 so as to effectively retain the ends of the spring units 11 in engagement in the channels 20, while the opposite ends of the springs are effectively retained in the spring housing member through the cooperation of the cover plate therewith. When it is desired to take up play between the ends of the springs and the buffer plates, the cover sections 16 may be removed from the spring housing and shims 23 inserted between the ends of the spring units and the base plate 12, so that the springs will be maintained under slight tension in the relation of the parts as shown in Figs. 1 and 2, in order that there will be no lost motion between the parts.

Any type of spring unit such as now used in the art may be employed in connection with this invention. With the use of the improved construction as above described, and shown in the drawings, where lost motion may be taken up in this buffer mechanism without disconnecting the tender from the locomotive, as required in present practice, effecting a considerable saving in time and labor incident to such operation as compared with the present practice, through merely lifting the floor plates of the locomotive cab, removing the cover section 16 which provides immediate access to the spring, and permits the insertion of shims where necessary or the replacement of the springs.

Having thus described my invention, what I claim as new is:—

1. A buffer mechanism for locomotives, comprising a spring housing member formed with a spring receiving section, a cover section adapted for detachable connection in said spring receiving section, a buffer unit telescopically associated with said spring housing, and formed with spring unit receiving channels, said cover section retaining said buffer assembly and spring unit in assembled operative relation.

2. A buffer mechanism for locomotives, comprising a spring housing member having a base plate, and a laterally extending casing section formed with flanges at the opposite ends, a buffer unit slidably engaged in said housing member having a buffer plate formed with a laterally extending portion provided with spring unit receiving channels, a flange formed on said unit closing the end portion of said channels adjacent the plates, spring units mounted in said channels and casing section of said housing member, and a cover section for said casing section detachably secured to said flanges, said cover section cooperating to retain said buffer unit and spring unit mounted in said housing member.

In testimony whereof I affix my signature.

HIRAM S. WILSON.

internal cone surfaces contacting the oblique ends of the knife blades, and opposing nuts having screw-threaded engagement with the operating shaft for independently holding said collars for axial adjustment in respect to each other and to cause said collars, by their internal cone surfaces acting on the oblique ends of the knife blades, to draw said knife blades at both ends radially inward onto the operating shaft.

3. An expansion reamer comprising in combination, a spindle, a plurality of longitudinal grooves in said spindle, a plurality of reamer blades longitudinally adjustable in the grooves, adjusting nuts threaded upon the spindle and disposed at opposite ends of the blades, and steady rings received on the spindle and interposed between the nuts and blades, said rings being provided with notches in their outer edges adjacent the blades, each notch being beveled in the same plane as an end of a blade so as to receive the same.

In testimony whereof I affix my signature.

WILLIAM AAB.